United States Patent
Lim et al.

(10) Patent No.: US 9,601,768 B2
(45) Date of Patent: Mar. 21, 2017

(54) SILICON OXIDE AND METHOD OF PREPARING THE SAME

(71) Applicant: LG CHEM, LTD., Seoul (KR)

(72) Inventors: Byung Kyu Lim, Daejeon (KR); Sang Yun Jung, Daejeon (KR); Cheol Hee Park, Daejeon (KR); Han Nah Jeong, Daejeon (KR); Je Young Kim, Daejeon (KR); Yong Ju Lee, Daejeon (KR); Hyun Chul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/224,955

(22) Filed: Mar. 25, 2014

(65) Prior Publication Data

US 2014/0248538 A1   Sep. 4, 2014

Related U.S. Application Data

(63) Continuation of application No. PCT/KR2013/011007, filed on Nov. 29, 2013.

(30) Foreign Application Priority Data

Nov. 30, 2012   (KR) .......................... 10-2012-0138531
Nov. 29, 2013   (KR) .......................... 10-2013-0146854

(51) Int. Cl.
*H01M 6/14*     (2006.01)
*H01M 4/48*     (2010.01)
(Continued)

(52) U.S. Cl.
CPC ............. *H01M 4/48* (2013.01); *C01B 33/113* (2013.01); *H01M 4/049* (2013.01);
(Continued)

(58) Field of Classification Search
CPC ... C01B 33/113; H01M 10/05; H01M 4/0471; H01M 4/049; H01M 4/48
See application file for complete search history.

(56) References Cited

U.S. PATENT DOCUMENTS 4,838,914 A * 6/1989 Ohta .................... C03B 37/011
                                                    264/623
7,955,581 B2   6/2011 Kogetsu et al.
(Continued)

FOREIGN PATENT DOCUMENTS

CN    101381083 A    3/2009
EP      1806317 A1   7/2007
(Continued)

OTHER PUBLICATIONS

Office Action of Japanese Patent Office in Appl'n. No. 2014-550230, dated Jun. 30, 2015.

*Primary Examiner* — Patrick Ryan
*Assistant Examiner* — Ben Lewis
(74) *Attorney, Agent, or Firm* — Dentons US LLP (57) ABSTRACT

The present invention relates to a method of preparing silicon oxide, in which the amounts of silicon and oxygen are appropriately controlled by decreasing the amount of the oxygen from silicon oxide containing a relatively large amount of oxygen, silicon oxide prepared by the method, and a secondary battery including the same. According to the method of preparing silicon oxide, silicon oxide (first silicon oxide) including a relatively large amount of oxygen is heat treated in a reducing atmosphere to decrease the amount of the oxygen in the silicon oxide (first silicon oxide) and to prepare silicon oxide (second silicon oxide) including silicon and oxygen in an appropriate amount ($Si:SiO_2=1:0.7$-$0.98$), thereby improving capacity and initial efficiency and securing stability and cycle properties (lifetime characteristics) of the secondary battery.

9 Claims, 2 Drawing Sheets (51) Int. Cl.
*C01B 33/113* (2006.01)
*H01M 4/04* (2006.01)
*H01M 4/485* (2010.01)
*H01M 10/052* (2010.01)

(52) U.S. Cl.
CPC ......... *H01M 4/0471* (2013.01); *H01M 4/485* (2013.01); *H01M 10/052* (2013.01); *Y02P 70/54* (2015.11)

(56) References Cited

U.S. PATENT DOCUMENTS

| | | | |
|---|---|---|---|
| 2005/0048369 A1* | 3/2005 | Koshina | H01M 4/0421 429/218.1 |
| 2007/0207381 A1* | 9/2007 | Ohtsuka | H01M 4/13 429/218.1 |
| 2007/0248525 A1 | 10/2007 | Fukuoka et al. | |
| 2010/0243951 A1 | 9/2010 | Watanabe et al. | |
| 2011/0086271 A1 | 4/2011 | Lee et al. | |
| 2011/0287313 A1 | 11/2011 | Fukuoka et al. | |
| 2012/0211695 A1 | 8/2012 | Kanno et al. | |

FOREIGN PATENT DOCUMENTS

| | | |
|---|---|---|
| EP | 2492995 A1 | 8/2012 |
| JP | 2010-225494 A | 10/2010 |
| JP | 2010-272411 A | 12/2010 |
| JP | 2011-108635 A | 6/2011 |
| JP | 2011-142021 A | 7/2011 |
| KR | 10-2007-0104848 A | 10/2007 |
| KR | 10-2011-0040478 A | 4/2011 |
| KR | 10-2012-0089073 A | 8/2012 |

\* cited by examiner

SILICON OXIDE AND METHOD OF PREPARING THE SAME

This application is a bypass continuation of International Application No. PCT/KR2013/011007, filed Nov. 29, 2013, and claims priority to and the benefit of Korean Application No. 10-2012-0138531, filed on Nov. 30, 2012, and Korean Application No. 10-2013-0146854, filed on Nov. 29, 2013, the disclosures of which are incorporated herein by reference.

TECHNICAL FIELD

The present invention relates to a method of preparing silicon oxide, in which the amounts of silicon and oxygen are appropriately controlled by decreasing the amount of the oxygen from silicon oxide containing a relatively large amount of oxygen, silicon oxide prepared by the method, and a secondary battery including the same, which uses an anode active material including the silicon oxide, and of which stability may be secured and capacity and cycle properties (lifetime characteristics) may be improved.

BACKGROUND ART

A lithium secondary battery is an energy storage device for storing electrical energy therein while lithium moves from an anode to a cathode during discharge and lithium ions move from a cathode to an anode during charge. When compared with other batteries, the lithium secondary battery has high energy density and small degree of self-discharge, and is widely used in various areas in general.

The constituent of the lithium secondary battery includes a cathode, an anode, an electrolyte and a separator. In early days, a lithium metal has been used as an anode active material in the lithium secondary battery, however has been replaced with a carbon-based material such as graphite because of the appearance of safety problems according to the repetition of charge and discharge. Since a carbon-based anode active material has similar electrochemical reaction potential with lithium ions as the lithium metal, and shows small change of crystalline structure during the continuous intercalation and deintercalation of the lithium ions, continuous charge and discharge may be possible and good charge and discharge lifetime may be realized.

However, in line with the expansion of the market from a small-sized lithium secondary battery used in a mobile phone to a large-sized secondary battery used in an automobile, techniques of increasing the capacity and the power of an anode active material are necessary. Thus, researches on developing a non-carbon-based anode active material are actively conducted mainly with silicon, tin, germanium, zinc, lead, or the like, which has higher theoretical capacity than the carbon-based anode active material.

These anode active materials may improve charge and discharge capacity and may increase energy density, however, since dendrite or a nonconductive material may be produced on an electrode by the repetition of the charge and discharge, the charge and discharge may be deteriorated, or expansion and contraction during the intercalation and deintercalation of lithium ions may be in a large scale. In this case, the secondary battery using the anode active material may insufficiently maintain discharge capacity according to the repetition of charge and discharge (hereinafter referred to as cycle properties), and may have an insufficient ratio of initial discharge capacity and initial charge capacity (discharge capacity/charge capacity, hereinafter referred to as initial efficiency).

Based on the above-described background, the present inventors have studied on a silicon-based anode active material capable of improving battery capacity as well as battery stability and cycle properties (lifetime characteristics), completed the present invention after securing that silicon oxide (second silicon oxide) would be prepared by heat treating silicon oxide (first silicon oxide) containing a relatively large amount of oxygen in a reducing atmosphere, and that a secondary battery using the silicon oxide as an anode active material had good battery stability and cycle properties (lifetime characteristics) while improving battery capacity.

DISCLOSURE OF THE INVENTION

Technical Problem

An object of the present invention is to provide a method of preparing silicon oxide in which the amounts of silicon and oxygen may be appropriately controlled by decreasing the amount of the oxygen from silicon oxide containing a relatively large amount of oxygen, thereby securing the stability of a secondary battery using an anode active material including the silicon oxide and improving the capacity and lifetime thereof.

Another object of the present invention is to provide silicon oxide prepared by the above-described method and including silicon and oxygen in an appropriate ratio (Si: $SiO_2$=1:0.7-0.98).

Further object of the present invention is to provide a secondary battery including an anode active material containing the silicon oxide.

Technical Solution

To achieve these and other advantages and in accordance with the purpose of the present invention, as embodied and broadly described, there is provided a method of preparing silicon oxide including providing first silicon oxide in a reactor in a reaction chamber, and heat treating under a reducing atmosphere to prepare second silicon oxide. The first silicon oxide is $SiO_x$ (0<x<2) and the second silicon oxide is $SiO_y$ (0<y<1), where y<x.

There is also provided in the present invention, silicon oxide prepared by the above-described method and including controlled amounts of silicon and oxygen by decreasing the amount of the oxygen through a post-treatment.

In addition, there is provide in the present invention, a secondary battery including an anode including an anode active material containing the silicon oxide, a cathode, a separator disposed between the anode and the cathode, and an electrolyte.

Advantageous Effects

In the method of preparing silicon oxide according to the present invention, silicon oxide (first silicon oxide) having a relatively large amount of oxygen is heat treated in a reducing atmosphere to decrease the amount of the oxygen in the silicon oxide (first silicon oxide), so that a silicon oxide (second silicon oxide) in which the silicon and the oxygen are present in an appropriate amount ratio (Si: $SiO_2$=1:0.7-0.98) may be prepared. Thus, the capacity properties, particularly, the initial efficiency of a battery may be improved due to the silicon, and the expansion during charge of the battery may be relieved due to the oxygen, thereby improving battery stability and battery cycle properties (lifetime characteristics).

Accordingly, the silicon oxide prepared by the present invention as the anode active material of a secondary battery may show good battery properties, may maintain or improve battery stability and cycle properties (lifetime characteristics), and so may be easily applied in industrial fields requiring thereof.

MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

According to the present invention, there is provided a method of preparing silicon oxide (second silicon oxide) in which the amounts of silicon and oxygen are appropriately controlled by decreasing the amount of the oxygen from silicon oxide (first silicon oxide) containing a relatively large amount of oxygen, thereby securing the stability of a secondary battery using an anode active material including the silicon oxide and improving the capacity and cycle properties (lifetime characteristics) thereof.

Generally, a lithium secondary battery includes a cathode, an anode, a separator disposed between the cathode and the anode, and an electrolyte, and the cathode and the anode, respectively, includes a cathode active material and an anode active material. A carbon-based material is mostly used as the anode active material. However, in line with the expansion of the market from small-sized electronic devices to large-sized automobiles, techniques on increasing the capacity and the power of an anode active material are necessary. Thus, developments on a non-carbon-based anode active material are actively conducted mainly with silicon that has higher theoretical capacity than the carbon-based anode active material.

However, since a silicon-based anode active material including silicon has larger charge and discharge capacity than the carbon-based anode active material, energy density may be increased. However, since dendrite or a nonconductive material may be produced on an electrode by charge and discharge, the charge and discharge may be deteriorated, or expansion and contraction during intercalation and deintercalation of lithium ions may be in a large scale, thereby lowering battery stability, and providing insufficient maintenance of discharge capacity according to the repetition of charge and discharge (cycle properties), and insufficient initial efficiency.

Therefore, a method of preparing silicon oxide in which the amounts of silicon and oxygen are appropriately controlled by decreasing the amount of the oxygen from silicon oxide containing a relatively large amount of oxygen is provided, thereby securing the stability of a secondary battery using an anode active material including the silicon oxide and improving the capacity and lifetime thereof.

The method of preparing silicon oxide according to an embodiment of the present invention includes providing first silicon oxide in a reactor in a reaction chamber, and heat treating under a reducing atmosphere to prepare second silicon oxide; the first silicon oxide is $SiO_x$ (0<x<2), and the second silicon oxide is $SiO_y$ (0<y<1), where y<x.

In the present invention, the silicon oxide and the second silicon oxide may mean the same material. That is, the method of preparing the silicon oxide may indicate the method of preparing the second silicon oxide.

In the silicon oxide of the present invention, silicon (Si) and silicon dioxide ($SiO_2$) may form a composite and coexist. That is, in the silicon oxide, the combination of a silicon atom having a dangling bond and the nearest atom therefrom, for example, four kinds of combinations of Si=$Si_3$, Si=$Si_2O$, Si=$SiO_2$ and Si=$O_3$ may exist.

Generally, if the number of a silicon-silicon (Si—Si) bonding material is large in silicon oxide, energy density may be increased by improving charge and discharge capacity of a secondary battery including the silicon oxide as an anode active material. However, the lithium ions during charge the secondary battery may be intercalated to excessively be expanded, and this problem may not be settled during discharge. Particularly, the silicon-silicon (Si—Si) bonding material (silicon particles) in the secondary battery is accompanied with complicated crystal change during performing the reactions of electrochemical intercalating and deintercalating lithium atoms. As the reactions of electrochemical intercalating and deintercalating lithium atoms proceed, the components and the crystal structure of the silicon-silicon (Si—Si) bonding material (silicon particles) may be changed into Si (crystal structure: Fd3m), LiSi (crystal structure: I41/a), Li2Si (crystal structure: C2/m), Li7Si2 (Pbam), Li22Si5 (F23), etc. In addition, according to the complicated change of the crystal structure, the volume of the silicon-silicon (Si—Si) bonding material (silicon particles) may expand by about 4 times. Thus, when the charge is repeated, the bonding material may expand in a large scale, and the stability and the cycle properties (lifetime characteristics) of the battery may be deteriorated. On the contrary, when the amount of a silicon-oxygen (Si—O) bonding material in the silicon oxide increases, the expansion may be relieved during the charge of a secondary battery even though lithium ions may be intercalated. In this case, the stability of the secondary battery may be maintained during repeated charge and discharge, however the battery capacity may be deteriorated. Thus, it is important that the silicon-silicon (Si—Si) bonding material and the silicon-oxygen (Si—O) bonding material are mixed in an appropriate ratio in the silicon oxide.

According to an embodiment of the present invention, the silicon-oxygen (Si—O) bonding material may be $SiO_2$.

According to the silicon oxide (second silicon oxide) prepared by the method of the present invention includes, the amounts of silicon and oxygen may be appropriately controlled by heat treating under a reducing atmosphere the first silicon oxide including a relatively large amount of oxygen and providing poor battery capacity. That is, the silicon oxide of the present invention includes a silicon-silicon (Si—Si) bonding material and a silicon-oxygen (Si—O) bonding material in an appropriate ratio, thereby maintaining the battery stability of a secondary battery including the silicon oxide and improving battery properties.

Particularly, the silicon oxide (second silicon oxide) may be prepared by placing the first silicon oxide in a reactor in a reaction chamber and heat treating under a reducing atmosphere, as described above. In this case, the first silicon oxide is $SiO_x$, the second silicon oxide is $SiO_y$, and $y<x$. Particularly, $0.9<x<1.5$ and $0.7<y<0.98$.

Here, y value may vary according to x value, for example, as the x value decreases, the y value may decrease. On the contrary, as the x value increases, the y value may increase. That is, the amount of oxygen (y value) of the second silicon oxide prepared by heat treating the first silicon oxide having a large amount of oxygen (x value) under the reducing atmosphere may be relatively greater than the amount of oxygen (y value) of the second silicon oxide prepared by heat treating the first silicon oxide having a small amount of oxygen (x value) under the reducing atmosphere.

The reducing atmosphere for preparing the second silicon oxide may be created by supplying a reducing gas or a mixture gas including the same, by providing a reducing material in a separate vessel in the chamber, or by applying both of them at the same time. Preferably, the reducing atmosphere may be produced by supplying the reducing gas or the mixture gas including the same.

The reducing gas may be at least one selected from the group consisting of $H_2$, $NH_3$ and CO, and may preferably be $H_2$.

The mixture gas is a mixture of the reducing gas and an inert gas. The mixture gas may include the reducing gas, that is, $H_2$, $NH_3$ or CO in the range of 1 vol % to 99 vol %. The inert gas may be $N_2$, however the present invention is not limited thereto.

The reducing gas or the mixture gas may be supplied by different flow rates according to the amount of the first silicon oxide to be reduced and the reaction vessel (reactor), for example, by the flow rate of 1 sccm (standard cubic centimeter per minutes) to 1,000 sccm. When the flow rate is less than 1 sccm, the reducing atmosphere may not be created, and the first silicon oxide may not be sufficiently reduced. Thus, the amount of the oxygen in the second silicon oxide thus prepared may not decrease. When the flow rate exceeds 1,000 sccm, an excessive amount of gas is supplied, and an inefficient process may be performed in view of energy efficiency.

The reducing material may be at least one selected from the group consisting of activated carbon, tantalum and molybdenum.

The heat treating may be performed at the temperature ranging from 800° C. to 1,000° C. Particularly, the heat treating may be performed by elevating the inner temperature of the reactor to the ranging from 800° C. to 1,000° C. and maintaining this temperature for 10 to 20 hours. When the heat treating temperature is less than 800° C., the amount of oxygen in the second silicon oxide thus prepared may not be decreased when compared with that in the first silicon oxide, and when the heat treating temperature exceeds 1,000° C., the silicon in the second silicon oxide thus prepared may grow into a large crystal, and the cycle properties (lifetime characteristics) of the secondary battery may be deteriorated.

Meanwhile, the first silicon oxide is not specifically limited in an embodiment of the present invention and may be prepared by, for example, mixing silicon and silicon dioxide, placing the mixture in a reactor in a reaction chamber, and increasing temperature under a reduced pressure in a first reducing atmosphere (reducing atmosphere for preparing the first silicon oxide).

The mixing method of the silicon and the silicon dioxide is not specifically limited, and any method that may uniformly mix the silicon and the silicon dioxide may be used, however a mechanical apparatus such as a paint shaker may be used. The silicon and the silicon dioxide may be mixed by the molar ratio of 0.5-2:2-0.5. When the molar ratio deviates from the above range, the amounts of unreacted silicon or unreacted silicon dioxide may increase, and the productivity may be deteriorated.

The elevation of the temperature includes the increasing of the inner temperature of the reactor and maintaining this temperature. For example, the inner temperature of the reactor in the chamber may be increased to 1,300° C. to 1,500° C., and this temperature may be maintained for 2 to 4 hours. The maintaining time period of temperature may be controlled differently at the above range according to the temperature. When the inner temperature of the reactor is less than 1,300° C., the reaction of the silicon and the silicon dioxide may be deteriorated, and the productivity of the first silicon oxide may decrease. When the inner temperature exceeds 1,500° C., the silicon may be melted.

The reduced pressure may be from $10^{-4}$ torr to $10^{-1}$ torr to produce a high-degree vacuum. The high-degree vacuum may be produced by using a rotary pump, a turbo molecular pump, and the like, however the present invention is not limited thereto. Thermodynamically, reactivity may be high, and a reaction at a low temperature may be possible at the high-degree vacuum. Thus, the maintenance of the high-degree vacuum may be preferable in performing a desired reaction. When the pressure exceeds $10^{-1}$ torr, the reaction of silicon and silicon dioxide may be deteriorated, and the productivity of the first silicon oxide may be lowered. When the pressure is less than $10^{-4}$ torr, realization of the reaction condition may be difficult when considering equipments and processing conditions.

The first reducing atmosphere for preparing the first silicon oxide may be produced by supplying a reducing gas or a mixture gas including the same, by providing a reducing material in a separate vessel in the chamber. The reducing gas, the mixture gas or the reducing material may be the same as described above or may be any one included therein. The mixing ratio, the flow rate or the conditions of the gas may be the same as described above.

Hereinafter, a method of preparing silicon oxide according to an embodiment of the present invention will be explained in more detail with reference to FIG. 1.

Figure 1A:
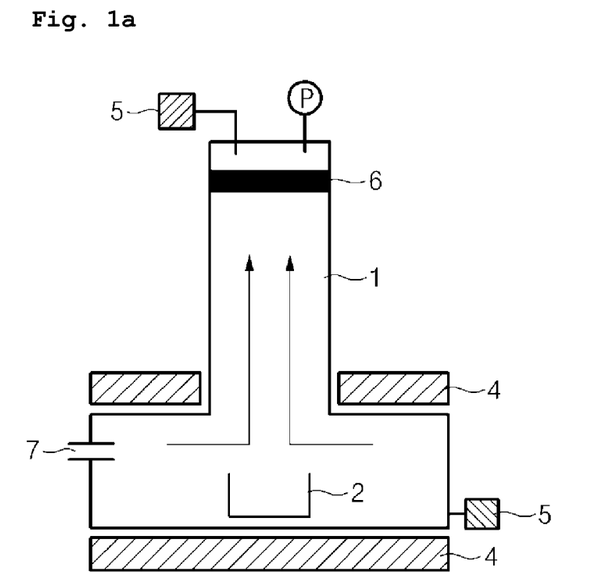
FIG. 1a illustrates schematic views of an apparatus for preparing silicon oxide using a reducing gas or a mixture gas according to an embodiment of the present invention.
Figure 1B:
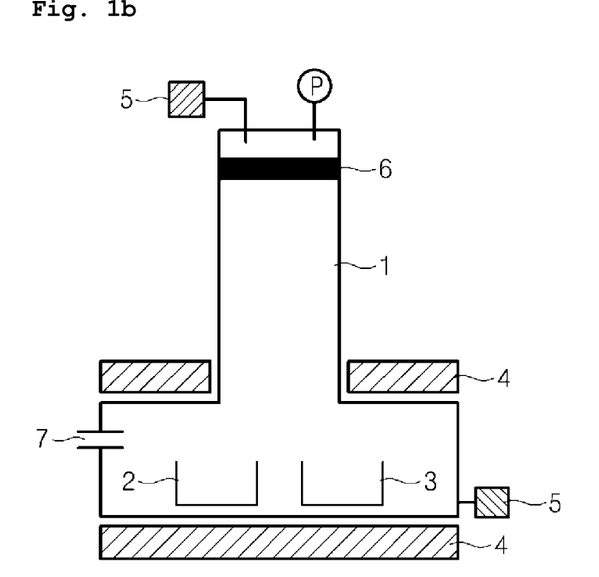
FIG. 1b illustrates schematic views of an apparatus for preparing silicon oxide using a reducing gas or a mixture gas with a reducing material according to an embodiment of the present invention.

FIG. 1 illustrates schematic views of apparatuses for preparing silicon oxide according to an embodiment of the present invention.

Referring to FIG. 1, the apparatus for preparing silicon oxide according to an embodiment of the present invention may include a reaction chamber 1, a reactor 2 positioned in the reaction chamber 1, electrical furnaces 4 disposed at the exterior of the reaction chamber 1 and the upper and lower portions of the reactor 2, a vacuum pump 5 positioned at the exterior of the reaction chamber 1 and connected to the inner part of the reaction chamber 1, and a collector 6 positioned at the upper portion of the reaction chamber 1 (See FIG. 1(a)). In addition, the apparatus for preparing silicon oxide may additionally include a gas nozzle 7 connected to one side of the reaction chamber 1 or a separate vessel 3 beside the reactor 2 according to the producing method of a reducing atmosphere (See FIG. 1(b)).

The silicon oxide according to an embodiment of the present invention may produce a reducing atmosphere by putting the first silicon oxide in the reactor 2 in the reaction chamber 1 and supplying a reducing gas or a mixture gas including the same into the reaction chamber 1 via the gas nozzle 7 (FIG. 1(a)), or by putting at least one reducing material selected from the group consisting of activated carbon, tantalum and molybdenum in the vessel 3 (FIG. 1(b)). After producing the reducing atmosphere, heat treating may be performed by using the electrical furnaces 4 to prepare the second silicon oxide, and the second silicon oxide thus prepared may be collected by the collector 6. In this case, the heat treating may be performed by adjusting the temperature to the ranging from 800° C. to 1,000° C. for 10 to 20 hours, as described above.

In addition, the first silicon oxide according to an embodiment of the present invention may also be prepared by using the above-described preparation apparatus.

Particularly, silicon and silicon dioxide may be put in the reactor 2 in the reaction chamber 1, and the inner temperature of the reactor 2 in the reaction chamber 1 may be elevated by means of the electrical furnaces 4 to the ranging from 1,300° C. to 1,500° C. A high-degree vacuum may be obtained by using the vacuum pump 5 (for example, a rotary pump, a turbo molecular pump, etc.). By producing a first reducing atmosphere in the reaction chamber 1 under the high-degree vacuum, the first silicon oxide may be prepared, and the first silicon oxide thus prepared may be collected in the collector 6.

Through the preparation method according to an embodiment of the present invention, the second silicon oxide including controlled amounts of silicon and oxygen may be prepared by heat treating the first silicon oxide at a relatively low temperature under a reducing atmosphere to decrease the amount of oxygen. Thus, the expansion of a secondary battery including an anode active material containing the second silicon oxide during charge may be relieved, and the stability of the secondary battery may be maintained. In addition, since the amount of the silicon is large, battery capacity may also be improved.

In addition, there is provided in the present invention, silicon oxide prepared by the above-described preparation method.

The silicon oxide prepared by an embodiment of the present invention may be the previously described second silicon oxide, and may be represented by SiOy ($0.7<y<0.98$). To analyze the components and the crystallinity of the silicon oxide, an X-ray diffraction (XRD) analysis was conducted, and the results are illustrated in FIG. 2.

Figure 2:
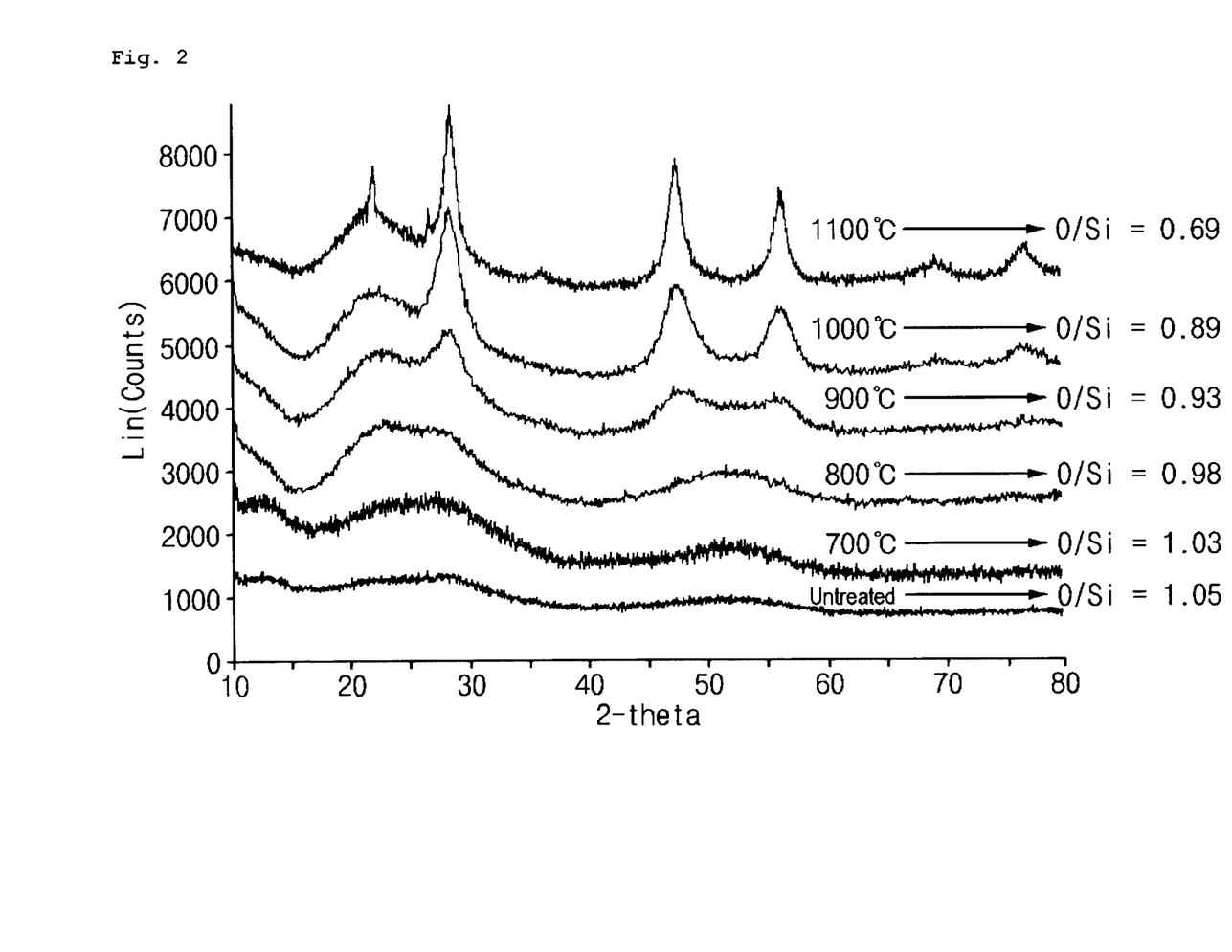
FIG. 2 is a graph illustrating X-ray diffraction (XRD) analysis results of silicon oxide according to an embodiment of the present invention.

As shown in FIG. 2, the silicon oxide has the full width at half-maximum (FWHM) of 1.5° to 2.5° in the range of $25°<2\theta<31°$ in a graph of XRD analysis using Cu—K$\alpha$.

The X-ray diffraction analysis according to an embodiment of the present invention may be conducted by pulverizing the silicon oxide and then measuring using an X-ray diffraction analyzer (Bruker AXS D4-Endeavor XRD). An applying voltage may be 40 kV, an applying current may be 40 mA, the range of 2θ measured may be 10° to 80°, and the measurement may be conducted by scanning with an interval of 0.05°. In this case, a variable divergence slit 6 mm may be used as a slit, and a large PMMA holder (diameter=20 mm) may be used to eliminate background noise due to a PMMA holder.

The FWHM of the present invention is a numerical value of a peak width at ½ position of the maximum peak intensity in the range of 25° to 31° of 2θ obtained from the analysis of the XRD of the silicon oxide.

Generally, the FWHM of the XRD analysis peak is inversely proportional to the size of a crystal. As the FWHM increases, the size of the crystal decreases, and as the FWHM decreases, the size of the crystal increases. Similarly, as amorphous properties increase, the FWHM increases, and as crystallinity increases, the FWHM decreases. As the FWHM increases (amorphous), battery stability may increase, however battery capacity may be deteriorated. As the FWHM decreases (crystalline), the capacity properties may increase, however the battery stability and cycle properties (lifetime characteristics) may be deteriorated.

The silicon oxide of the present invention may have the FWHM in the range of 1.5° to 2.5° (½ of the maximum peak in the range of $25°<2\theta<31°$ in the XRD analysis graph using Cu—K$\alpha$) as described above, and this result means that the silicon oxide includes a crystalline state (for example, silicon) and an amorphous state (for example, silicon oxide, silicon dioxide) in an appropriate ratio. Thus, the stability of a secondary battery including the silicon oxide as the anode active material may be maintained, the cycle properties (lifetime characteristics) of the secondary battery may be increased, and the capacity properties of the secondary battery may be improved.

The silicon (Si) in the silicon oxide may be amorphous or crystalline, and in the case that the silicon is crystalline, the size of the crystal may be from 0.2 nm to 5 nm. When the size of the crystal is less than 0.2 nm, the battery capacity properties of a secondary battery including the silicon oxide as the anode active material may be deteriorated, and when the size of the crystal exceeds 5 nm, the stability and the cycle properties (lifetime characteristics) of the secondary battery may be deteriorated. In this case, the size of the crystal may be analyzed by means of an analyzing apparatus such as an XRD or an electron microscope (SEM, TEM) and the like.

In addition, the g value (a value showing the quantity of a radioactive chemical reaction which occurs by the action of radioactive rays onto a material) of the silicon oxide measured by an electron spin resonance (ESR) spectrometer may be 2.0015 to 2.0055.

The g value measured by the ESR spectrometer is concerned with the deterioration of the cycle properties (lifetime characteristics) of a secondary battery. In the silicon oxide, the combination of a silicon atom having a dangling bond and the nearest atom therefrom is present, and the ESR spectrometer detects the dangling bond (silicon atom) due to the combination to measure the g value of the silicon oxide. The g value increases as the number of silicon-silicon bonds increases, while decreasing as the number of silicon-oxygen bonds increases. As described above, as the number of the silicon-silicon bonds increases in the silicon oxide, that is, as the g value increases, the expansion ratio during the charge of a secondary battery including the silicon oxide as an anode active material may increase. As the number of the silicon-oxygen bonds increases, that is, as the g value decreases, the expansion during the charge may be relieved, however the capacity properties of the battery may also be deteriorated. This is because the amount of the oxygen in the silicon oxide is excessive, and electrical conductivity is deteriorated.

Therefore, the silicon oxide according to the present invention is characterized by having the g value of 2.0015 to 2.0055 to maintain the battery stability and the cycle properties (lifetime characteristics) of the secondary battery using the silicon oxide while improving the battery capacity properties. When the g value is less than 2.0015, the expansion ratio of the secondary battery including the silicon oxide as the anode active material may be deteriorated, and the stability and the cycle properties (lifetime characteristics) of the battery may be improved. However, since the amount of the oxygen in the silicon oxide is excessive, the electrical conductivity may be lowered, and the battery capacity properties, that is, battery performance may be deteriorated. On the contrary, when the g value exceeds 2.0055, a large amount of silicon is included in the silicon oxide, and the battery capacity properties may be improved and the battery performance may become good. However, the expansion ratio during charge of the battery increases, and the stability and the cycle properties (lifetime characteristics) of the battery may be deteriorated.

In addition, there is provided in the present invention, a secondary battery including an anode including an anode active material containing the silicon oxide, a cathode, a separator disposed between the anode and the cathode, and an electrolyte.

The anode is not specifically limited and may be manufactured by coating a mixture of the anode active material containing the silicon oxide, a conductive material and a binding agent on an anode current collector and drying. A filler may be additionally added in the mixture as occasion demands.

The anode current collector is not specifically limited only if not inducing the chemical change of a battery and having conductivity, and may include, for example, copper, stainless steel, aluminum, nickel, titanium, baked carbon, and surface treated copper or stainless steel with carbon, nickel, titanium, silver, etc. In addition, minute embossing may be formed on the surface of the anode current collector to reinforce the binding force of an anode active material, and the anode current collector may be used in various shapes such as a film, a sheet, a foil, a net, a porous body, a foamed body, a non-woven fabric, etc.

The conductive material is not specifically limited only if not inducing the chemical change of a battery and having conductivity and includes, for example, graphite such as natural graphite or synthetic graphite; carbon blacks such as carbon black, acetylene black, ketchen black, channel black, furnace black, and lamp black; and a conductive fiber such as a carbon fiber and a metal fiber.

The binding agent is an auxiliary component of the bonding of the active material and the conductive material and the bonding to the current collector and preferably includes components referred to as an anti-corrosive material. Generally, polyvinylidene fluoride, polyacrylate, polyvinyl alcohol, carboxymethyl cellulose, starch, hydroxypropyl cellulose, regenerated cellulose, polyvinyl pyrrolidone, tetrafluoroethylene, polyethylene, polypropylene, an ethylene-propylene-dien terpolymer, a sulfonated ethylene-propylene-dien terpolymer, a styrene butylene rubber, a fluorine rubber, and the like may be used.

In addition, the cathode may be manufactured by coating a mixture including a cathode active material, a conductive material and a binding agent on a cathode current collector and drying. A filler may be added in the mixture as occasion demands.

The conductive material and the binding agent may be the same as described above.

The cathode current collector is not specifically limited only if not inducing the chemical change of a battery and having high conductivity and includes, for example, stainless steel, aluminum, nickel, titanium, baked carbon, and surface treated aluminum or stainless steel with carbon, nickel, titanium, silver, etc. In addition, minute embossing may be formed on the surface of the cathode current collector to increase the binding force of a cathode active material, and the cathode current collector may be used in various shapes such as a film, a sheet, a foil, a net, a porous body, a foamed body, a non-woven fabric, etc.

The cathode active material is not specifically limited only if commonly used in this art and includes, for example, a lamellar compound of lithium cobalt oxide ($LiCoO_2$), lithium nickel oxide ($LiNiO_2$), and the like, or a substituted compound thereof with one or more transition metals; lithium manganese oxide ($LiMnO_2$); lithium copper oxide ($Li_2CuO_2$); vanadium oxide; lithiated nickel oxide of a nickel site type; and a compound including a lithium intercalation material as a main component such as lithium manganese composite oxide, disulfide compound or a composite oxide formed from the combination thereof.

The separator is not specifically limited, and an insulating thin film having high ion permeability and mechanical strength may be used. For example, polyethylene, polypropylene, polytetrafluoroethylene, polyethylene terephthalate, polybutylene terephthalate, polyethylene naphthalate and a combination thereof having a microporous structure may be used.

In addition, the electrolyte may include an organic solvent and a lithium salt commonly included in an electrolyte without specific limitation.

The anion of the lithium salt may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2$ $CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$ and $(CF_3CF_2SO_2)_2N^-$.

Typical examples of the organic solvent may be at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sufolane, gamma-butyrolactone, propylene sulfite and tetrahydrofuran.

In addition, the electrolyte of the present invention may further include an additive such as an overcharge preventing agent commonly included in an electrolyte as occasion demands.

The lithium secondary battery of the present invention may be manufactured by forming an electrode assembly by disposing a separator between a cathode and an anode, putting the electrode assembly into a cylindrical battery case or a square shape battery case, and injecting an electrolyte thereinto. Alternatively, the electrode assembly may be stacked and the stacked assembly may be impregnated with an electrolyte. After that, the product thus obtained may be sealed into a battery case.

Commonly used battery case in this field may be selected as the battery case used in the present invention, and the appearance of the battery case according to the use of a battery is not specifically limited. For example, a cylindrical shape using a can, a square shape, a pouch shape, a coin shape, and the like may be used.

Hereinafter, exemplary embodiments of the present invention will now be described in detail to particularly explain the present invention. However, exemplary embodiments of the present invention may be modified in various types, and the scope of the present invention is not interpreted to be limited to the following exemplary embodiments. Exemplary embodiments of the present invention are provided to a person with an average knowledge in this art to completely explain the present invention.

PREPARATION EXAMPLE

Preparation of First Silicon Oxide 40 g of silicon (Si) and 86 g of silicon dioxide ($SiO_2$) were put in a bottle, and stirred in a paint shaker at the rate of 300 rpm for 3 hours or more for complete mixing.

12.5 g of the mixture of the silicon (Si) and the silicon dioxide ($SiO_2$) was put in a reactor in a reaction chamber, and a vacuum pump was operated to increase vacuum degree in the reactor while increasing the temperature to 1,400° C. in the reaction chamber by using an electrical furnace. The temperature was increased from room temperature to 800° C. for 1 hour and 30 minutes, and then, from 800° C. to the reaction temperature of 1,400° C. for 2 hours and 30 minutes. The reaction temperature of 1,400° C. was maintained for 3 hours, and pressure was reduced to $1.2 \times 10^{-1}$ torr. A mixture gas of $H_2/N_2$ ($H_2$: 2 vol. %) was supplied by the flow rate of 800 sccm. After conducting the process, the reactor was cooled naturally. When the temperature of the reactor reached less than 300° C., the supplying of the gas was stopped, and the powder thus prepared was collected from a collector. The collected silicon oxide powder was $SiO_{1.05}$.

EXAMPLE 1

The first silicon oxide ($SiO_{1.05}$) prepared in the Preparation Example was provided in the reactor in the reaction chamber, and a mixture gas of $H_2/N_2$ (2 vol. % $H_2$) was supplied at the flow rate of 300 sccm while increasing the temperature of the inner portion of the reactor to 800° C. When the temperature reached 800° C., the reaction was conducted for 12 hours to perform a reaction and to prepare second silicon oxide. The second silicon oxide collected in the collector was obtained as a powder state.

EXAMPLE 2

A second silicon oxide powder was obtained by conducting the same procedure described in Example 1 except that the inner temperature of the reactor was reached to 900° C. and maintained at the temperature during performing a reaction.

EXAMPLE 3

A second silicon oxide powder was obtained by conducting the same procedure described in Example 1 except that the inner temperature of the reactor was reached to 1,000° C. and maintained at the temperature during performing a reaction.

EXAMPLE 4

A second silicon oxide powder was obtained by conducting the same procedure described in Example 1 except that the mixture gas was supplied at the flow rate of 800 sccm.

EXAMPLE 5

A second silicon oxide powder was obtained by conducting the same procedure described in Example 1 except that the mixture gas was supplied at the flow rate of 800 sccm, and the inner temperature of the reactor was reached to 900° C. and maintained at the temperature during performing a reaction.

EXAMPLE 6

A second silicon oxide powder was obtained by conducting the same procedure described in Example 1 except that the mixture gas was supplied at the flow rate of 800 sccm, and the inner temperature of the reactor was reached to 1,000° C. and maintained at the temperature during performing a reaction.

EXAMPLE 7

A second silicon oxide powder was obtained by conducting the same procedure described in Example 1 except that a mixture gas of $H_2/N_2$ (4 vol. % $H_2$) was used.

EXAMPLE 8

A second silicon oxide powder was obtained by conducting the same procedure described in Example 1 except that a mixture gas of $H_2/N_2$ (4 vol. % $H_2$) was used, and the inner temperature of the reactor was reached to 900° C. and maintained at the temperature during performing a reaction.

EXAMPLE 9

A second silicon oxide powder was obtained by conducting the same procedure described in Example 1 except that a mixture gas of $H_2/N_2$ (4 vol. % $H_2$) was used and the inner temperature of the reactor was reached to 1,000° C. and maintained at the temperature during performing a reaction.

EXAMPLE 10

A second silicon oxide powder was obtained by conducting the same procedure described in Example 4 except that a mixture gas of $H_2/N_2$ (4 vol. % $H_2$) was used.

EXAMPLE 11

A second silicon oxide powder was obtained by conducting the same procedure described in Example 4 except that a mixture gas of $H_2/N_2$ (4 vol. % $H_2$) was used, and the inner temperature of the reactor was reached to 900° C. and maintained at the temperature during performing a reaction.

EXAMPLE 12

A second silicon oxide powder was obtained by conducting the same procedure described in Example 4 except that a $H_2/N_2$ (4 vol. % $H_2$) mixture gas was used, and the inner temperature of the reactor was reached to 1,000° C. and maintained at the temperature during performing a reaction.

EXAMPLE 13

A second silicon oxide powder was obtained by conducting the same procedure described in Example 5 except that a reducing atmosphere was produced by using activated carbon instead of the mixture gas.

EXAMPLE 14

A second silicon oxide powder was obtained by conducting the same procedure described in Example 5 except that a reducing atmosphere was produced by additionally adding charcoal.

COMPARATIVE EXAMPLE 1

The first silicon oxide prepared in the Preparation Example was not additionally treated, and the prepared powder of the first silicon oxide was used as it was.

Comparative Example 2

A second silicon oxide powder was obtained by conducting the same procedure described in Example 1 except that the inner temperature of the reactor was reached to 700° C. and maintained at the temperature during performing a reaction.

COMPARATIVE EXAMPLE 3

A second silicon oxide powder was obtained by conducting the same procedure described in Example 1 except that the inner temperature of the reactor was reached to 1,100° C. and maintained at the temperature during performing a reaction.

EXAMPLE 1-1

A lithium secondary battery including an anode active material containing the second silicon oxide prepared in Example 1 was manufactured. The lithium secondary battery was manufactured by a common method.

A cathode was manufactured by coating a cathode active material mixture including LiCoO$_2$ cathode active material on a cathode current collector and drying. An anode was manufactured by coating an anode active material mixture including an anode active material containing the second silicon oxide prepared in Example 1 on an anode current collector and drying.

A polyolefin separator was disposed between the cathode and anode thus manufactured, and an electrolyte was injected thereinto to manufacture the lithium secondary battery. In this case, the electrolyte was a non-aqueous electrolyte obtained by adding 1.0 M of LiPF$_6$ into an organic solvent obtained by mixing ethylene carbonate and diethyl carbonate.

EXAMPLE 2-1

A lithium secondary battery was manufactured by conducting the same procedure described in Example 1-1 except for using an anode active material containing the second silicon oxide prepared in Example 2.

EXAMPLE 3-1

A lithium secondary battery was manufactured by conducting the same procedure described in Example 1-1 except for using an anode active material containing the second silicon oxide prepared in Example 3.

EXAMPLE 4-1

A lithium secondary battery was manufactured by conducting the same procedure described in Example 1-1 except for using an anode active material containing the second silicon oxide prepared in Example 4.

EXAMPLE 5-1

A lithium secondary battery was manufactured by conducting the same procedure described in Example 1-1 except for using an anode active material containing the second silicon oxide prepared in Example 5.

EXAMPLE 6-1

A lithium secondary battery was manufactured by conducting the same procedure described in Example 1-1 except for using an anode active material containing the second silicon oxide prepared in Example 6.

EXAMPLE 7-1

A lithium secondary battery was manufactured by conducting the same procedure described in Example 1-1 except for using an anode active material containing the second silicon oxide prepared in Example 7.

EXAMPLE 8-1

A lithium secondary battery was manufactured by conducting the same procedure described in Example 1-1 except for using an anode active material containing the second silicon oxide prepared in Example 8.

EXAMPLE 9-1

A lithium secondary battery was manufactured by conducting the same procedure described in Example 1-1 except for using an anode active material containing the second silicon oxide prepared in Example 9.

EXAMPLE 10-1

A lithium secondary battery was manufactured by conducting the same procedure described in Example 1-1 except for using an anode active material containing the second silicon oxide prepared in Example 10.

EXAMPLE 11-1

A lithium secondary battery was manufactured by conducting the same procedure described in Example 1-1 except for using an anode active material containing the second silicon oxide prepared in Example 11.

EXAMPLE 12-1

A lithium secondary battery was manufactured by conducting the same procedure described in Example 1-1 except for using an anode active material containing the second silicon oxide prepared in Example 12.

EXAMPLE 13-1

A lithium secondary battery was manufactured by conducting the same procedure described in Example 1-1 except for using an anode active material containing the second silicon oxide prepared in Example 13.

EXAMPLE 14-1

A lithium secondary battery was manufactured by conducting the same procedure described in Example 1-1 except for using an anode active material containing the second silicon oxide prepared in Example 14.

COMPARATIVE EXAMPLE 1-1

A lithium secondary battery was manufactured by conducting the same procedure described in Example 1-1 except for using an anode active material containing the first silicon oxide prepared in Comparative Example 1.

COMPARATIVE EXAMPLE 2-1

A lithium secondary battery was manufactured by conducting the same procedure described in Example 1-1 except for using an anode active material containing the second silicon oxide prepared in Comparative Example 2.

COMPARATIVE EXAMPLE 3-1

A lithium secondary battery was manufactured by conducting the same procedure described in Example 1-1 except for using an anode active material containing the second silicon oxide prepared in Comparative Example 3.

EXPERIMENTAL EXAMPLE 1

Analysis of Oxygen Amount

The amount of oxygen in each of the second silicon oxides prepared in Examples 1 to 14 and Comparative Examples 1 to 3 was measured, respectively. The amount of oxygen was measured by using an Oxygen Nitrogen Determinator (ONH; ONH2000, Eltra) for five times per each of the second silicon oxides. The amount of oxygen was measured by comparing 3 mg of a standard sample $SiO_2$ with 3 mg of each of the second silicon oxides after pre-treating at 80° C. for 2 hours. Among the five measured results, an average value was obtained from three middle values excluding the maximum value and the minimum value, and the dispersion of the thus obtained values was calculated as a relative standard deviation. The results are shown in the following Table 1.

TABLE 1

| Division | Amount of oxygen (O/Si ratio) | Relative standard deviation (% RSD) |
|---|---|---|
| Example 1 | 0.98 | 2.27 |
| Example 2 | 0.93 | 2.45 |
| Example 3 | 0.89 | 2.81 |
| Example 4 | 0.95 | 2.19 |
| Example 5 | 0.92 | 2.09 |
| Example 6 | 0.89 | 1.65 |
| Example 7 | 0.97 | 2.46 |
| Example 8 | 0.92 | 2.41 |
| Example 9 | 0.88 | 2.80 |
| Example 10 | 0.92 | 3.00 |
| Example 11 | 0.89 | 2.54 |
| Example 12 | 0.88 | 2.68 |
| Example 13 | 0.93 | 2.90 |
| Example 14 | 0.92 | 3.74 |
| Comparative Example 1 | 1.05 | 0.36 |
| Comparative Example 2 | 1.03 | 0.53 |
| Comparative Example 3 | 0.69 | 3.04 |

As shown in Table 1, it was secured that the silicon oxide (second silicon oxide) prepared by post-treating according to the preparation method of an embodiment of the present invention and according to Examples 1 to 14 includes decreased amount of oxygen with respect to silicon when compared to the silicon oxide prepared without the post-treatment (Comparative Example 1) and the silicon oxide prepared by post-treating at a lower temperature range than the temperature range of the present invention (Comparative Example 2), and includes increased amount of oxygen with respect to silicon when compared to the silicon oxide prepared by post-treating at a higher temperature range than the temperature range of the present invention (Comparative Example 3). In view of the result, the silicon oxide prepared according to the preparation method of the present invention may be considered to include silicon and oxygen in an appropriate ratio ($Si:SiO_2$=1:0.7-0.98). Thus, the stability and the cycle properties (lifetime characteristics) of the battery may be maintained, and battery capacity properties (efficiency) may be improved at the same time.

EXPERIMENTAL EXAMPLE 2

Analysis of XRD

An XRD analysis was performed to analyze the crystalline properties and the crystal size of each of the second silicon oxides prepared in Examples 1 to 3 and Comparative Examples 1 to 3. The results thus obtained are illustrated in the following Table 2 and FIG. 2.

The XRD analysis was performed by using an X-ray diffraction analyzer (Bruker AXS D4-Endeavor XRD). An applying voltage was 40 kV, and an applying current was 40 mA. The measured range of 2θ was 10° to 80°, and the measurement was performed by scanning with an interval of 0.05°. In this case, a variable divergence slit 6 mm was used as a slit, and a large PMMA holder (diameter=20 mm) was used to eliminate background noise due to a PMMA holder.

In addition, the crystallinity of each of the silicon oxides prepared in Examples 1 to 3 and Comparative Examples 1 to 3 was secured and the FWHM of the maximum peak in the range of 25° to 31° of 2θ in a graph obtained from the XRD analysis was analyzed.

TABLE 2

| Division | Crystal size of silicon (Si, nm) | FWHM (°) |
|---|---|---|
| Example 1 | 0.2 | 2.5 |
| Example 2 | 2.0 | 2.0 |
| Example 3 | 4.5 | 1.5 |
| Comparative Example 1 | 0.1 | 2.8 |
| Comparative Example 2 | 0.1 | 2.7 |
| Comparative Example 3 | 7.0 | 1.0 |

As shown in Table 2, it would be secured that a silicon crystal grown in the silicon oxides (second silicon oxides) prepared after post-treating (heat treating in a reducing atmosphere) in Examples 1 to 3 according to the preparation method of an embodiment of the present invention was not too large or too small when compared to a silicon crystal grown in the silicon oxide prepared without the post-treatment (Comparative Example 1) and a silicon crystal grown in the silicon oxides prepared by post-treating in a temperature range deviated from the temperature range of the present invention (Comparative Examples 2 and 3).

In addition, as shown in Table 2 and FIG. 2, it would be secured from the FWHM of XRD peak formed in $25°<2\theta<31°$ that the peak of the silicon oxides (second silicon oxides) prepared after post-treating (heat treating in a reducing atmosphere) in Examples 1 to 3 according to the preparation method of an embodiment of the present invention was not too large or too small when compared to the peak of the silicon oxide prepared without the post-treatment (Comparative Example 1) and the peaks of the silicon oxides prepared by post-treating in a temperature range deviated from the temperature range of the present invention (Comparative Examples 2 and 3). From the result, it would be found that the silicon crystal formed in the silicon oxide according to the present invention was not excessively grown, as shown in Table 2.

As confirmed from Table 2 and FIG. 2, the silicon oxide (second silicon oxide) according to the present invention includes a crystalline state (for example, silicon) and an amorphous state (for example, silicon oxide and silicon dioxide) in an appropriate ratio. Thus, the stability of a secondary battery including the silicon oxide as an anode active material may be maintained, and the cycle properties (lifetime characteristics) and the capacity properties of the secondary battery may be improved at the same time.

EXPERIMENTAL EXAMPLE 3

Analysis of Battery Efficiency

Analysis of the efficiency of each battery was performed to compare and analyze the battery efficiency of each of the lithium secondary batteries manufactured in Examples 1-1 to 14-1 and Comparative Examples 1-1 to 3-1. Each of the lithium secondary batteries manufactured in the examples and the comparative examples was charged to 5 mV with a constant current, and charged with a constant voltage until a current reached to 0.005 C at 5 mV. Then, the battery was discharged with a constant current to 1.5 V and 1.0 V. Each capacity of charge and discharge was measured, and the battery efficiency was calculated by using the measured result, respectively. The results thus obtained are illustrated in the following Table 3.

TABLE 3

| Division | Capacity (mAh/g) | | | Efficiency (%) | |
|---|---|---|---|---|---|
| | Charge | Discharge (1.0 V) | Discharge (1.5 V) | 1.0 V | 1.5 V |
| Example 1 | 2278.83 | 1490.19 | 1614.26 | 65.4 | 70.8 |
| Example 2 | 2223.60 | 1435.31 | 1547.49 | 64.5 | 71.5 |
| Example 3 | 2395.24 | 1520.98 | 1731.73 | 63.5 | 72.3 |
| Example 4 | 2403.18 | 1535.69 | 1747.11 | 63.9 | 72.7 |
| Example 5 | 2453.60 | 1589.93 | 1793.58 | 64.8 | 73.1 |
| Example 6 | 2630.20 | 1741.71 | 1933.20 | 66.6 | 73.5 |

TABLE 3-continued

| Division | Capacity (mAh/g) | | | Efficiency (%) | |
|---|---|---|---|---|---|
| | Charge | Discharge (1.0 V) | Discharge (1.5 V) | 1.0 V | 1.5 V |
| Example 7 | 2482.50 | 1586.32 | 1794.85 | 63.9 | 72.3 |
| Example 8 | 2530.30 | 1639.63 | 1834.47 | 64.8 | 72.5 |
| Example 9 | 2660.12 | 1774.30 | 1957.85 | 66.7 | 73.6 |
| Example 10 | 2481.20 | 1600.37 | 1806.31 | 64.5 | 72.8 |
| Example 11 | 2523.32 | 1650.25 | 1844.55 | 65.7 | 73.1 |
| Example 12 | 2665.21 | 1870.36 | 1956.26 | 66.8 | 73.4 |
| Example 13 | 2458.30 | 1546.27 | 1757.68 | 62.9 | 71.5 |
| Example 14 | 2480.50 | 1580.08 | 1805.80 | 63.7 | 72.8 |
| Comparative Example 1 | 2629.18 | 1663.02 | 1790.89 | 63.2 | 68.1 |
| Comparative Example 2 | 2835.3 | 1794.4 | 1933.1 | 63.3 | 68.2 |
| Comparative Example 3 | 2753.3 | 1709.5 | 1844.7 | 62.1 | 67.0 |

As shown in Table 3, it would be secured that the initial battery efficiency of each of the secondary batteries of Examples 1-1 to 14-1 manufactured by using anode active materials including the silicon oxides (second silicon oxides) prepared after post-treating according to the preparation method of an embodiment of the present invention was improved when compared to the secondary battery (Comparative Example 1-1) manufactured by using an anode active material including the silicon oxide prepared without the post-treatment and the secondary batteries (Comparative Examples 2 and 3) manufactured by using anode active materials including the silicon oxides prepared by post-treating in a temperature range deviated from the temperature range of the present invention. In view of the result, the silicon oxide prepared according to the preparation method of the present invention would be considered to include silicon and oxygen in an appropriate ratio. Thus, battery capacity properties, particularly, the battery initial efficiency may be good due to the silicon.

EXPLANATION ON DESIGNATED SYMBOLS

1: Reaction chamber
2: Reactor
3: Vessel
4: Electrical furnace
5: Vacuum pump
6: Collector
7: Gas nozzle

The invention claimed is:

1. A method of preparing silicon oxide for anode active material, comprising:
    providing a first silicon oxide in a reactor in a reaction chamber, and heat treating under a reducing atmosphere to prepare a second silicon oxide,
    wherein the first silicon oxide is $SiO_x$ ($0<x<2$), and the second silicon oxide is $SiO_y$, where $y<x$ and $0.7<y<0.98$,
    wherein the heat treating is performed at a temperature ranging from 800° C. to 1,000° C. and the temperature is maintained for 10 to 20 hours, and
    wherein a crystal size of silicon (Si) in the second silicon oxide is in a range of 0.2 nm to 5 nm.
2. The method of preparing silicon oxide for anode active material of claim 1, wherein $SiO_x$ in the first silicon oxide satisfies $0.9<x<1.5$.

3. The method of preparing silicon oxide for anode active material of claim 1, wherein the reducing atmosphere is created by supplying at least one reducing gas selected from the group consisting of $H_2$, $NH_3$ and CO, or a mixture gas of the reducing gas and an inert gas.

4. The method of preparing silicon oxide for anode active material of claim 3, wherein the reducing gas or the mixture gas is supplied by a flow rate of 1 sccm to 1,000 sccm.

5. The method of preparing silicon oxide for anode active material of claim 1, wherein the reducing atmosphere is created by providing at least one material selected from the group consisting of an activated carbon, tantalum and molybdenum in a separate vessel in the reaction chamber.

6. Silicon oxide for anode active material prepared by the method according to claim 1,
wherein the silicon oxide is $SiO_y$, where $0.7<y<0.98$, and
wherein a crystal size of sillicon (Si) in the silicon oxide is in a range of 0.2 nm to 5 nm.

7. The silicon oxide for anode active material of claim 6, wherein a full width at half-maximum (FWHM) of the silicon oxide in a range of $25°<2\theta<31°$ in a graph of X-ray diffraction (XRD) analysis using Cu—K$\alpha$ is in a range of 1.5° to 2.5°.

8. The silicon oxide for anode active material of claim 6, wherein the silicon oxide has a g value measured by using an electron spin resonance (ESR) spectrometer in a range of 2.0015 to 2.0055.

9. A lithium secondary battery comprising an anode including an anode active material containing the silicon oxide for anode active material according to claim 6, a cathode, a separator disposed between the anode and the cathode, and an electrolyte.

* * * * *